Feb. 26, 1957 F. A. KROHM 2,782,443
WINDSHIELD WIPER ASSEMBLY
Filed March 9, 1953 4 Sheets-Sheet 1
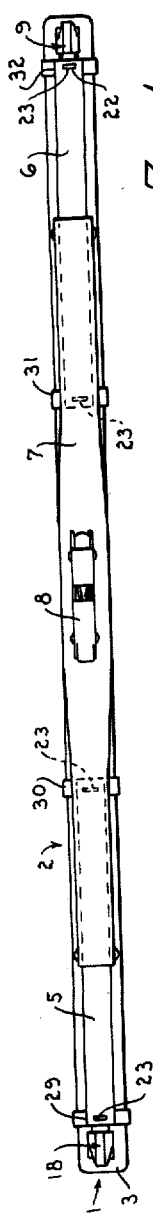
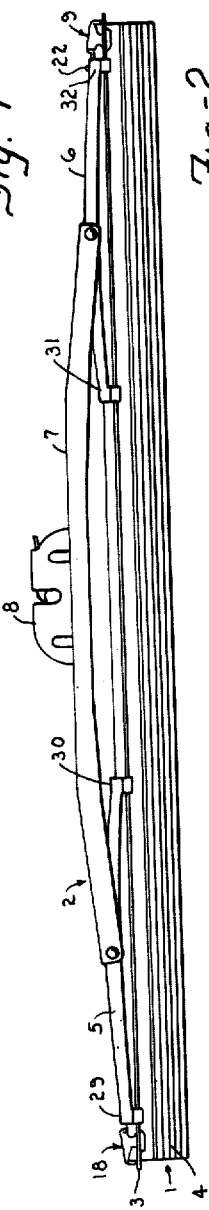
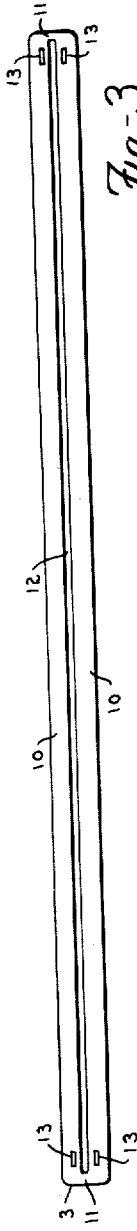
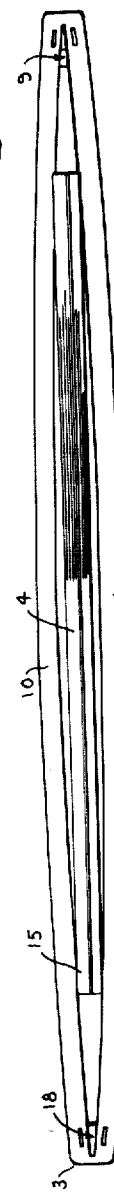
INVENTOR.
FRED A. KROHM
BY
Charles S. Penfold
ATTORNEY

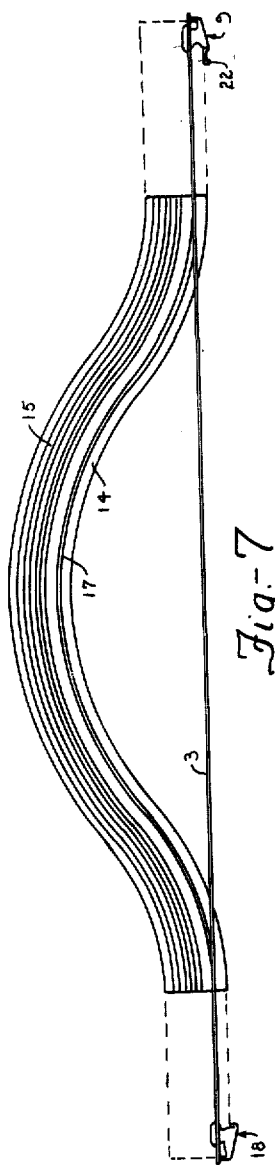
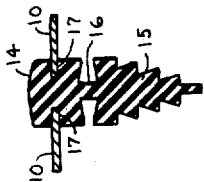
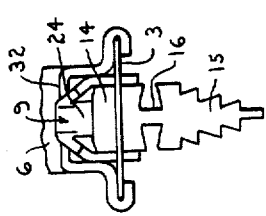
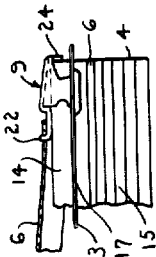
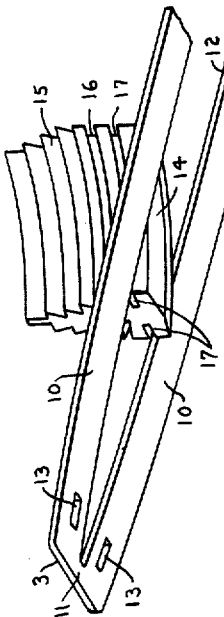
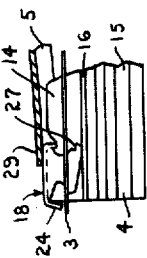

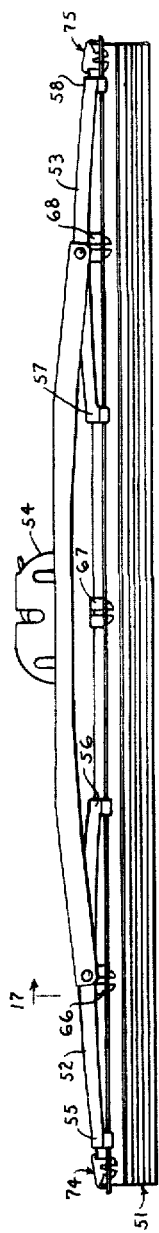
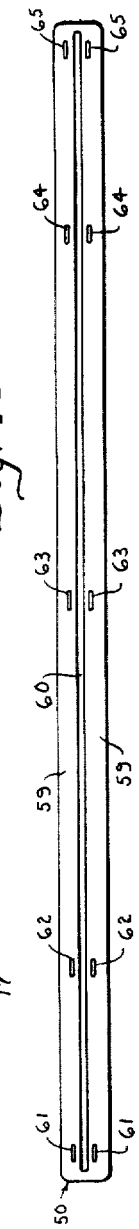
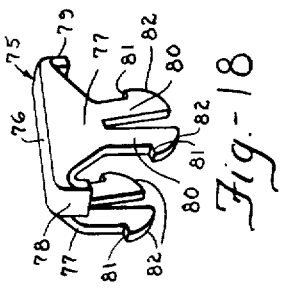
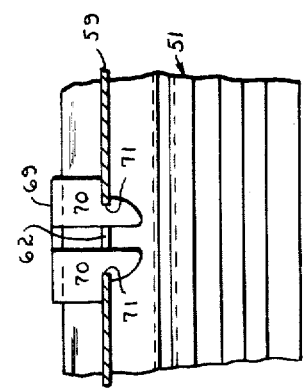
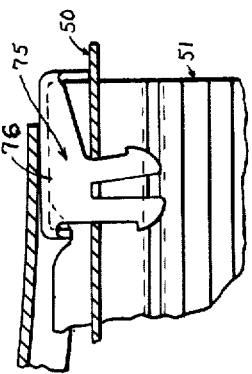

Feb. 26, 1957 F. A. KROHM 2,782,443
WINDSHIELD WIPER ASSEMBLY
Filed March 9, 1953 4 Sheets-Sheet 4
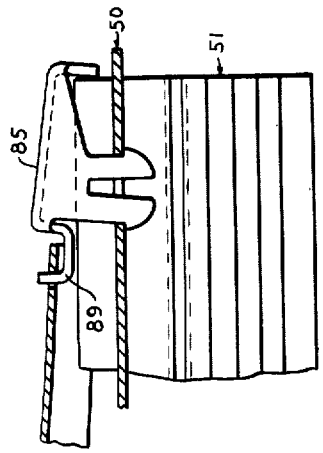
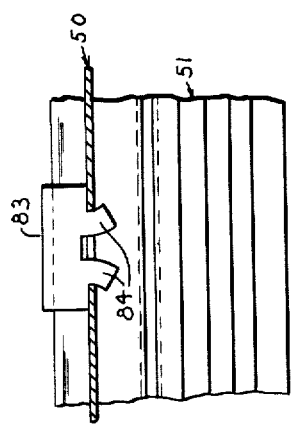
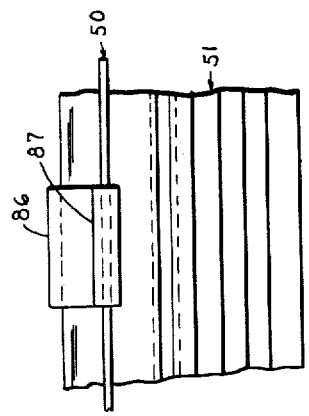
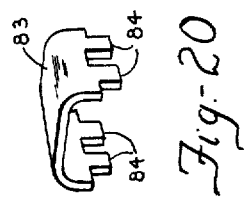
INVENTOR.
BY
Charles S. Penfold
ATTORNEY

United States Patent Office 2,782,443
Patented Feb. 26, 1957

2,782,443
WINDSHIELD WIPER ASSEMBLY

Fred A. Krohm, Hobart, Ind., assignor to Productive Inventions, Inc., a corporation of Indiana Application March 9, 1953, Serial No. 341,051

19 Claims. (Cl. 15—245)

This invention relates generally to windshield wipers preferably adapted for cleaning curved windshields.

More particularly the invention is directed to a wiper assembly comprising a wiper blade and a pressure device therefor. The wiper blade comprises an elongated resiliently flexible support or backing and a resilient wiper element and the pressure device preferably includes a pair of secondary yokes having their ends operatively connected to the blade, a primary yoke having its ends respectively connected to the secondary yokes, and means on the primary yoke for attachment with a windshield wiper arm.

This application is generally related to my copending applications Serial Nos. 297,098 and 334,147; and an application of John W. Anderson, Serial No. 404,279, which disclose different forms of locking means or abutment means for detachably holding the wiper blade and pressure device together.

It is recognized that various means and methods have been employed to connect the flexible support and resilient wiping element of such a wiper blade together. In some blades now in commercial use the support is comprised of several individual or separate parts which are secured together by fasteners and in other blades the support and element are so constructed that they are not only difficult to assemble but when once assembled the wiping element is not sufficiently free in its movement to permit it to readily conform to a surface to be cleaned.

With the foregoing in mind, an important object of the invention is to provide a wiper blade embodying novel principles of design and construction and a unique method of assembling the flexible support and resilient wiping element constituting the components of the blade.

More particularly, the invention overcomes certain disadvantages inherent in the commercial forms of blades above referred to and has proven to be of great value in facilitating assembly of the components and reducing costs of manufacture.

Another object of the invention is to provide improved means for operatively connecting the wiper blade and pressure device therefor. The means for this purpose preferably includes a fitting or lock which is carried by the blade and interlocks with either of the secondary yokes to hold the blade and device detachably connected so that if desired the pressure device may be provided with a new blade.

An additional object of the invention is to provide a fitting which can be easily and quickly connected to the blade in a manner whereby the resilient wiping element serves to normally maintain the fitting in a locking position.

A significant object of the invention is to provide a wiper blade in which the support for the wiping element is constructed in one piece and includes a pair of longitudinally extending portions or members and improved means are provided for connecting or interlocking the portions or members at one or more locations intermediate the ends of the blade to positively hold the portions or members of the support in proper operative relationship to the wiping element. Connecting means for this purpose have proven particularly advantageous in relatively long wiper blades.

Another object of the invention is to provide a blade of the character just referred to, in which the connecting means and members of the support are so designed and constructed that the connecting means can be snapped into connection with the member.

A specific object of the invention is to provide a blade in which the connecting means do not in any way interfere with the operation of the secondary yokes of the pressure device.

Another object of the invention is to provide a blade of the kind referred to in which snap connection means are adapted for attachment to the ends or extremities of the flexible support or backing means for holding the pressure device operatively connected with the support.

Other objects and advantages of the invention will become apparent after the description hereinafter set forth is considered in conjunction with the drawings annexed hereto.

In the drawings:

Figures 1 through 12 exemplify one modification of the invention;

Figure 1 is a top view of the wiper blade assembly embodying the invention;

Figure 2 is a side view in elevation of the assembly depicted in Figure 1;

Figure 3 is a top view of the support of the wiper blade;

Figure 4 is a bottom view of the support and wiping element showing portions of the support spread apart to receive the wiping element;

Figures 5 and 6 are perspective views of fittings which are adapted for attachment to the support;

Figures 7 and 8 are views showing the manner in which the wiping element and support are assembled;

Figure 9 is an end view of the wiper blade;

Figure 10 is a transverse section showing the connection between the support and wiping element;

Figures 11 and 12 exemplify the mode of assembling the wiper blade and pressure device therefor;

Figures 13 through 19 exemplify another modification of the invention;

Figure 13 is a side view in elevation of the wiper assembly embodying certain improvements over the assembly illustrated in Figure 2;

Figure 14 is a top view of the flexible support for the wiper element;

Figure 15 is a perspective view of a clip or connecting means which is employed for connecting or interlocking longitudinal portions or members of the support together;

Figure 16 is a partial enlarged view in elevation illustrating the application of the connecting means illustrated in Figure 15 to the wiper blade;

Figure 17 is an enlarged transverse section taken substantially on line 17—17 of Figure 13;

Figure 18 is a perspective view of one of the pair of snap connection means employed for holding the pressure device and wiper blade assembled;

Figure 19 is an enlarged partial elevational view illustrating the operation of the snap connection means just referred to;

Figures 20 and 21 illustrate a modified form of means for connecting or interlocking portions of the support;

Figure 22 is a partial view of a modified form of one of a pair of means employed for locking the pressure device in operative relationship to the wiper blade; and Figures 23 and 24 depict another modified form of means that may be employed to connect or interlock the longitudinal portions of the support.

The modification of the invention illustrated in Figures 1 through 12 will be described first.

Referring more particularly to the drawings, the windshield wiper blade is generally designated 1 and the pressure device therefor is designated 2.

The wiper blade is comprised of an elongated resiliently flexible support or backing 3 and a resilient wiping element 4 carried by the support.

The pressure device may be constructed in various ways but as herein illustrated preferably includes a pair of corresponding secondary yokes 5 and 6 having their ends connected to the wiper blade, a primary yoke 7 having its ends connected to intermediate portions of the secondary yokes, a connector 8 carried by the primary yoke for connection with a windshield wiper arm, and a fitting or locking means 9 for operatively connecting the wiper blade and pressure device.

The flexible support 3 is preferably constructed from suitable flat spring strip material, such as stainless steel. The support is preferably of a predetermined uniform thickness and width so that the blade may uniformly freely flex and conform to the surface to be cleaned. Due to the character of the support, the blade is primarily limited to flexation or movement in a direction substantially perpendicular to a surface of a windshield to be cleaned.

The support, as shown in Figure 3, is preferably constructed in one piece and includes a pair of corresponding longitudinally extending parallel flat portions or members 10 and a pair of corresponding integral connecting portions 11 adjacent the extremities of the support for joining the longitudinal portions together. Expressed otherwise, the support is provided with a centrally disposed longitudinal slot 12. A pair of smaller slots 13 is provided adjacent each end of the support in straddling relationship to the center slot 12. As will be described more in detail subsequently the longitudinally extending portions 10 of the support are adapted for relative movement so as to accommodate the wiping element and either pair of slots 13 is adapted to receive portions of the locking means 9.

The wiping element, as clearly exemplified in Figures 9 and 10, is provided with an attaching portion 14 and a wiping portion 15 which is joined to the attaching portion by an intermediate restricted portion or web 16 so as to permit tilting of the wiping portion. The attaching portion is provided with a pair of corresponding grooves 17, one being located adjacent each side of the attaching portion in a predetermined position so that they lie substantially in the same plane. The grooves 17 receive the inner marginal edge portions of the longitudinally extending portions 10 of the support for holding the support and element assembled.

The fitting or locking means 9, clearly shown in Figures 2, 6 and 9, is attached to one end of the support and a fitting 18 of similar construction is attached to its other end. Each fitting is preferably of channel construction and includes an upper inclined wall 19 and corresponding legs 20 adapted for disposition in a pair of slots 13. The fitting 9 is different from the fitting 18 in that the inner end of its upper wall is provided with a continuation forming an offset 21 terminating in an upturned flange 22 for entry into a transverse opening 23 provided in the end of the secondary yoke 6 as shown in Figures 1 and 2. With this arrangement a portion of the secondary yoke 6 is located in a recess defined by the continuation to provide a positive interlock between the secondary yoke and fitting. The outer end of the wall of each fitting is also provided with a downturned stop 24 which may engage an end of the wiping element. Although the fitting 18 is not provided with a continuation having a finger thereon, it is provided with a portion 25. This portion 25 and the continuation 21 on the fitting 9 are adapted to bear against the top of the attaching portion 14 of the wiping element for support thereby. Each of the legs 20 of the fittings is widened at its free extremity to provide a pair of abutments 26 and a pair of abutments 27 for engaging the underside of the support. It will be noted that each of the legs is provided with a notch 28 to provide clearance to permit entry of the legs in an angular direction into the slots 13.

Assembly of the fittings 9 and 18 with the wiper blade and the support with the wiping element will now be described. One method consists in fastening the fittings in the support and then placing the support in a suitable jig or fixture so that the fittings assume depending positions as depicted in Figure 7. Assembly of the support and wiping element is unique. It is easily and preferably accomplished by gripping the longitudinally extending portions 10 and then spreading, bowing, or flexing the portions outwardly substantially in the same plane as illustrated in Figures 4 and 8 to enlarge the slot 12 so that it is wider adjacent the mid-area of the support and tapers in opposite directions from such area. The ends of the wiping element are then directed into the slot as illustrated in Figures 7 and 8 to place the grooves 17 in registery with the inner edges of longitudinal portions 10 of the support, whereupon the ends of the element are pulled or pushed simultaneously outwardly toward the ends of the support into receiving relationship with the fittings, after which the longitudinal portions 10 of the support are released from tension so they automatically return to their normal parallel positions and in embracing connecting relationship with the element. The base of the fixture for holding the support is preferably provided with a longitudinally extending groove which is of a predetermined width and depth to assist in piloting and guiding the wiping element into the slot 12 of the support.

If found desirable, first one and then the other extremity of the wiping element may be inserted into the respective ends of slot 12. Also, one or both of the fittings 9 and 18 can be attached to the blade after the support and wiping element are assembled. For example, the ends of the wiping element can be pulled or pushed toward the center of the support to permit entry of the fittings into the pairs of slots 13, after which the ends of the element are forced outwardly into the fittings. More specifically in this respect, either or both of the fittings can be attached to the support before or after the element and support are assembled. It should be noted that the arrangement is such that either end of the element can be inserted into either half of the slot 12 from either side of the support and that either fitting can be inserted into either pair of the slots 13.

Referring again to the pressure device 2, attention is directed to the fact that the ends of the secondary yoke 5 are provided with formations 29 and 30 and the ends of the secondary yoke 6 with formations 31 and 32. These formations embrace the exposed outer longitudinal marginal edge portions of the support as clearly shown in Figures 1, 2 and 9 and each formation is preferably provided with an opening 23. When the blade and pressure device are assembled, the formations 29, 30 and 31 are constructed to freely slide on the support whereas the formation 32 is interlocked with the fitting 9 against movement. With this setup either secondary yoke can be connected to either end of the primary yoke so that an opening 23 in the outer extremity of each secondary yoke will be located adjacent a fitting.

Assembly of the wiper blade and pressure device can be easily effected by inserting either end of the wiper blade into either end of the pressure device. More particularly in this respect, the preferred method, as illustrated to some extent in Figure 11, is to place the left end of the support into the formation 32 and then force the formation over the upper wall 19 of fitting 18, which wall due to its inclination will cam the fitting downwardly and compress the attaching portion 14 of the wiping element. After this formation passes this fitting the fitting will return to its original predetermined position. The formation 31 of the secondary yoke 6 and the formation 30 of yoke 5 are then successively pressed over the fitting 18 and when the formation 32 is brought into abutting relation with the finger 22 of fitting 9, the fitting 9 is manipulated by a digit of the hand or other means against the wiping element so that the formation 32 can be pressed on the fitting 9 to cause the finger 22 to automatically enter or snap into the opening 23 in formation 32. When assembled in this manner, the pressure device and wiper blade will appear as illustrated in Figures 1 and 2 with the secondary yoke 6 interlocked with the fitting 9. With this novel arrangement the wiping element serves to lock the fitting 9 to the support and element and interlock the pressure device to the blade.

The assembly of the blade and pressure device just described requires that the fitting 18 be depressed four times by the formations on the secondary yokes. A different method of assembly can be effected by sliding the pressure device and the blade into connection from directions opposite to those above described, in which event, the formations 29, 30, 31 and 32 on the secondary yokes will successively depress the fitting 9, but direct manual pressure must be applied to the formation 30 to release it from the finger 22 before formations 31 and 32 can cam the fitting against the wiping element.

The fitting 18 normally serves to improve the appearance of the blade assembly by covering the left end of the wiping element in the same manner as the fitting 9 but does not interlock the pressure device with the blade. The fitting 18 may also serve as a stop to prevent detachment of the pressure device and blade if for any reason the fitting 9 should become accidentally disconnected from the secondary yoke 6.

The modification of the invention exemplified in Figures 13 through 19 will now be described. The wiper blade assembly illustrated in Figure 13 comprises a wiper blade unit and a pressure device therefor, which except for a few modifications are substantially the same as the blade and device described above.

More particularly, the wiper blade comprises an elongated flexible support or backing means 50 and a resilient wiping element 51 carried by the support. The wiping element 51 is identical to the wiping element 4 above referred to.

The pressure device preferably includes a pair of corresponding secondary yokes 52 and 53, the ends of which are operatively connected to the flexible support of the blade, and a primary yoke or bridge, the ends of which are pivotally connected to intermediate portions of the secondary yokes. The primary yoke is provided with a connector 54 for detachably connecting the wiper assembly to a wiper arm.

The secondary yokes are preferably of channel construction and the end of one yoke is provided with formations 55 and 56 and the other yoke with formations 57 and 58 which embrace the outer longitudinally extending marginal edge portions of the flexible support.

The flexible support is preferably a one-piece construction having a pair of corresponding longitudinally extending portions or members 59 forming an elongated centrally disposed slot 60 which corresponds to the slot provided in the support above referred to. The support is further provided with five pairs of slots 61, 62, 63, 64 and 65 constituting abutment means. More specifically, the pairs of slots 61 and 65 are respectively located adjacent the extremities or ends of the support, the pair of slots 63 adjacent the center of the support, and the pairs 62 and 64 are respectively located between the pairs 61 and 63 and pairs 63 and 65.

Various means may be utilized to connect the longitudinal portions of the support but as herein exemplified three clips, 66, 67 and 68 are employed. Each connecting means or clip is preferably made generally U-shaped in construction to include a base wall 69 and a pair of side walls. Each side wall is formed to provide a pair of corresponding flexible legs 70 which are adapted for movement relative to one another in the plane of the wall. A notch 71 is provided in the outer edge of each leg and the free extremity of each leg is curved as indicated at 72 so as to assist in piloting the pairs of legs into either of the pairs of slots 62 through 64. It will be noted that the combined widths of each pair of legs is slightly less than the width of the side wall from which they are formed so that the side walls adjacent the notches provide stops 73 which are adapted to engage the upper surface of the longitudinal members of the connecting means to limit downward movement of the connecting means.

To assemble a connecting means to the blade it is merely necessary to place the means in straddling relationship to the upper portion of the wiping element so that the free extremities of each pair of legs register with a slot, after which the connecting means is pressed downwardly to cause the legs to move toward one another or otherwise contract and when the stops 73 on the side walls engage the upper surface of the support the legs will snap outwardly so that the notches 71 receive those portions of the support which extend longitudinally from the slots as clearly shown in Figure 16. As shown in Figures 16 and 17, the size of each clip is preferably such that it more or less snugly receives the upper portion of the wiping element and so that none of the connecting means will in any way interfere with the operation of the pressure device when connected to the blade. In furtherance of this objective the connecting means or clips 66 and 68 are respectively secured to the support substantially intermediate the ends of the secondary yokes and that the clip 67 is secured substantially midway between the end formations 56 and 57 of the secondary yokes as clearly shown in Figure 13.

It will be noted that the extremities of the legs 72 on each clip also straddle that portion of the wiping element located under the support 50 so as to stabilize in some measure such underlying portion. Obviously one or more connecting means or clips may be employed, the number used being more or less dependent on the length of a wiper blade assembly.

With this unique arrangement or organization the longitudinally extending portions 59 of the support are positively held in a predetermined relationship so that the inner longitudinal marginal edge portions of the members are properly held in the exterior longitudinally extending grooves formed in the attaching portion of the wiping element as clearly shown in Figure 17. The clips hold the longitudinal portions or members of the support substantially in the same plane and thereby prevent the portions from moving relative to one another in a plane transverse to the plane of the support. During cold wet weather the wiping element now and then freezes to the windshield and when an attempt is made to release it, the wiping element is sometimes pulled out of the support. The present invention serves to prevent this from happening.

The means employed for locking the pressure device in operative relationship with the wiper blade unit will now be described. A pair of corresponding locking means 74 and 75 are employed for this purpose. One of such means is clearly illustrated in Figures 18 and 19. Each locking means substantially corresponds to the locking means 9 and 18 illustrated in Figure 5, except that the means is designed and constructed for snap connection with the support. More specifically, each of the means includes an inclined top wall 76 and a pair of side walls 77. The top wall is provided with an inner depending portion 78 and an outer depending stop portion 79. Each side wall is formed to provide a pair of legs 80 flexible in the plane of the wall in the same manner that the legs 70 of the clips illustrated in Figure 15 are flexible. The outer longitudinal edge of each leg is provided with an abutment 81 for limiting upward movement of the clip and the free end of each leg is preferably curved as indicated at 82 so that the pair of legs may be readily piloted into either of the pair of slots 61 and 65.

When the locking means are attached to the support 50 they will be resiliently supported on the wiping element 51 like the locking means 9 and 18 above referred to.

With this novel arrangement either or both of the locking means 74 and 75 can be attached to the support before or after the pressure device is assembled with the blade unit and the same is true of the clips 66 through 68. In practice, however, after the wiping element and support are assembled, the clips and locking means are attached to the support, after which the pressure device and blade are assembled by threading either end of the support and certain of the clips and locking means through the formations on the secondary yokes. More specifically in this respect, if for example the pressure device is slid to the left for connection with the blade so that the formation 55 on the yoke 52 receives the right end of the support, the formation 55 will depress the locking means 75 and successively pass over the clips 68, 67 and 66. The other formation 56 on the yoke 52 and the formations 57 and 58 will similarly cause depression of the locking means 75 and the formation 56 will successively pass over the clips 68 and 67 and the formation 57 over the clip 68.

In Figures 20 and 21 there is disclosed a modified form of clip designated 83. This clip differs from the clips above described by providing each of its side walls with a pair of legs 84 which after being inserted into a slot are bent outwardly in the plane of the wall to permanently lock the clip to the support, as distinguished from a detachable snap connection.

Figure 22 illustrates a locking means 85 similar to the locking means 74 and 75, except that it is provided with an extension or finger 89 corresponding to the finger 23 on the locking means 18 for detachable connection with either of the secondary yokes as exemplified to prevent relative longitudinal sliding movement between one of the secondary yokes of the pressure device and blade unit.

In Figures 23 and 24, a modified form of clip 86 is shown for holding the longitudinal portions of the support together. This clip is provided with ears 87 which are preferably preformed. It is attached to the support by threading the support through the ears and after its location is established, the ears are forcibly clamped against the support to lock the clip in place.

It is to be understood that other means of holding the edges of the two longitudinal members of the flexible support in alignment with each other have been employed. Among such means have been a series of more closely arranged spaced-apart cross members formed integrally with the longitudinal members. The subject invention employing identical clips 66, 67, and 68 has, as compared with said integral means, some important advantages. One advantage is that snow, when present, tends to collect between the primary yoke which, in Figure 13, is shown extending from the mid portions of secondary yokes 52 and 53, and the longitudinal flexing members 59. When the integral cross member or similar means is employed, that means obstructs the discharge of the snow from the blade assembly, with the result that it packs in seriously and disables the blade. The clips or connecting means 66, 67, and 68 may be of relatively thin material and may be installed snugly to the back of the rubber wiping element so as to offer a minimum of obstruction to the discharge of snow. Another advantage is that the use of flat longitudinal members permits the use of more desirable, harder, springlike material while the formation of integral cross members requires the use of softer, less desirable material.

This application is a continuation in part of my application entitled Windshield Wiper Blade Assembly and Method of Assembling the Components Thereof, Serial No. 334,147, which was filed January 30, 1953.

Having thus described my invention, it is obvious that various modifications may be made in the same without departing from the spirit of the invention; and, therefore, I do not wish to be understood as limiting myself to the exact forms, constructions, arrangements, and combination of parts herein shown and described and defined in the claims.

I claim:
1. A windshield wiper blade comprising an elongated resilient wiping member and an elongated resiliently flexible support having longitudinal portions embracing and supporting the wiping member, abutment means provided on the longitudinal portions intermediate the ends of the support and spaced inwardly from the exterior marginal edges of the portions, and a member having a pair of legs engaging the abutment means on one longitudinal portion and a pair of legs engaging the abutment means on the other portion for locking the portions together, said legs also being spaced inwardly from the exterior marginal edges of the longitudinal portions of the support.

2. A windshield wiper assembly comprising a wiper blade having an elongated resilient wiping member and an elongated resiliently flexible support having longitudinal portions embracing and supporting the wiping member, abutment means provided on the longitudinal portions intermediate the ends of the support and spaced inwardly from the exterior marginal edges of the portions, a member having a pair of legs engaging the abutment means on one longitudinal portion and a pair of legs engaging the abutment means on the other portion for locking the portions together, said legs also being spaced inwardly from the exterior marginal edges of the longitudinal portions of the support, a pressure device having relatively movable parts connected to the wiper blade, and locking means attached to the ends of the wiper blade for holding the pressure device operatively assembled with the blade between said locking means.

3. A windshield wiper assembly comprising a wiper blade having an elongated resilient wiping member and an elongated resiliently flexible support having longitudinal portions embracing and supporting the wiping member, a pressure device adapted for slidable connection with the blade comprising a pair of secondary yokes having ends attached to the blade and a primary yoke having its ends attached to the secondary yokes, locking means at the ends of the blade for holding the pressure device operatively assembled with the blade, and separate means connecting the said longitudinal portions of the support together at a location between the ends of the secondary yokes, said separate means being of a size to permit at least the ends of one of the secondary yokes to slide thereover when the pressure device is being slidably connected to the blade.

4. A windshield wiper assembly comprising a wiper blade having an elongated resilient wiping member and an elongated resiliently flexible support having longitudinal portions embracing and supporting the wiping member, a pressure device adapted for slidable connection with the blade comprising a pair of secondary yokes having ends attached to the blade and a primary yoke having its ends attached to the secondary yokes, locking means at the ends of the blade for holding the pressure device operatively assembled with the blade, and separate means spaced from the points of attachment between the ends of the secondary yokes and blade connecting the said longitudinal portions of the support, said separate means being of a size to permit certain of the ends of each yoke to slide thereover when the pressure device is being slidably connected to the blade.

5. A windshield wiper assembly comprising a blade having an elongated resilient wiping element and an elongated resiliently flexible support having longitudinal portions embracing and supporting the wiping element, a hole provided in each of the longitudinal portions intermediate the ends of the support, a member having a pair of legs extending into the hole in one longitudinal portion and a pair of legs extending into the hole in the other portion for locking the portions together, and a pressure device having a plurality of movable parts connected to the blade at longitudinally spaced locations apart from the member.

6. A windshield wiper blade comprising an elongated resilient wiping member and an elongated resiliently flexible one-piece member having longitudinal portions embracing and supporting the wiping member, said longitudinal portions being arranged in substantially the same plane, a hole provided in one of the longitudinal portions, and connecting means having means disposed in and yieldably engaging the material defining the hole and also having means engaging the other longitudinal portion for holding the longitudinal portions in said plane.

7. A windshield wiper blade comprising an elongated resilient wiping member and an elongated resiliently flexible one-piece member having longitudinal portions embracing and supporting the wiping member, said longitudinal portions being arranged in substantially the same plane, holes provided in the longitudinal portions, and connecting means having means held in said holes for locking said longitudinal portions in said plane.

8. A windshield wiper blade comprising an elongated resilient wiping member and an elongated resiliently flexible member having longitudinal portions embracing and supporting the wiping member, said longitudinal portions being arranged in substantially the same plane, means located at the ends of the blade for limiting movement of a pressure device adapted for attachment to the blade, of a plurality of longitudinally spaced holes provided in each of the longitudinal portions of the support, and means yieldably held in the holes for locking the said longitudinal portions together.

9. A windshield wiper comprising a blade having an elongated resilient wiping member and an elongated resiliently flexible support having longitudinal portions embracing and supporting the wiping member, said longitudinal portions being arranged in substantially the same plane, a pressure device comprising a pair of yokes, means connecting the ends of the yokes to the blade at longitudinally spaced points, and means for attaching the yokes to a wiper arm, and clamp means securing the said longitudinal portions of the support together at a location between the connecting means.

10. The structure defined in claim 9 in which a separate means secures the longitudinal portions at a location between the ends of each yoke.

11. A windshield wiper comprising a blade having an elongated resilient wiping member and an elongated resiliently flexible one-piece support having longitudinal portions embracing and supporting the wiping member, said longitudinal portions being arranged in substantially the same plane, a pressure device comprising a pair of yokes and means for attaching the yokes to a wiper arm, the ends of the yokes being slidably connected to the blade at longitudinally spaced points, snap-connection means carried by the ends of the blade for releasably holding the pressure device operatively assembled with the blade between said snap-connection means, and additional snap-connection means connecting the said longitudinal portions of the support together between the ends of each yoke and between the yokes.

12. The structure defined in claim 11, in which one of the snap-connection means at one end of the blade is connected to one of the yokes.

13. The structure set forth in claim 11, in which the additional snap-connection means are of a size to permit the yokes to pass thereover when the yokes are being slid into connection with the blade.

14. A windshield wiper comprising a blade having an elongated resilient wiping member and an elongated resiliently flexible support having longitudinal portions supporting the wiping member, said longitudinal portions being arranged in substantially the same plane, a pressure device comprising a pair of yokes, means connecting the ends of the yokes to the blade at longitudinally spaced points, a bridge joining the yokes, means on the bridge for attachment to a wiper arm, and separable means securing the said longitudinal portions of the support together at a location between certain of the connecting means.

15. A windshield wiper comprising a blade having an elongated resilient wiping member and an elongated resiliently flexible support having longitudinal portions supporting the wiping member, said longitudinal portions being arranged in substantially the same plane, a pressure device comprising a pair of yokes having ends slidably connected to the blade, a bridge joining the yokes, means on the bridge for attachment to a wiper arm, stop means respectively carried by the ends of the blade for releasably holding the pressure device operatively assembled with the blade between said stop means, and snap-connection means connecting the said longitudinal portions of the support together between the yokes.

16. The structure defined in claim 15, in which one of the stop means at one end of the blade is connected to one of the yokes.

17. The structure set forth in claim 15, in which the snap-connection means is of a size to permit one yoke to pass thereover when the yokes are being slid into connection with the blade.

18. A connector for use with a wiper blade having a resilient wiping element and a support therefor having longitudinal extending flexible portions provided with holes on opposite sides of the element, said connector having a bridge portion overlying the element and a pair of legs having yieldable portions adapted for disposition in the holes of the flexible portions to prevent spreading of the latter.

19. A wiper blade comprising a resilient wiping element and a support having longitudinally extending flexible portions supporting the element, holes provided in the flexible portions on opposite sides of and close to the element, a connector having a bridge portion overlying the element and yieldable legs caught in the holes to prevent spreading of said flexible portions.

References Cited in the file of this patent

UNITED STATES PATENTS

| | | |
|---|---|---|
| 2,548,090 | Anderson | Apr. 10, 1951 |
| 2,596,063 | Anderson | May 6, 1952 |
| 2,687,544 | Scinta | May 31, 1954 |

FOREIGN PATENTS

| | | |
|---|---|---|
| 667,253 | Great Britain | Feb. 27, 1952 |
| 683,375 | Great Britain | Nov. 26, 1952 |

UNITED STATES PATENT OFFICE
CERTIFICATE OF CORRECTION

Patent No. 2,782,443                                                February 26, 1957

Fred A. Krohm

It is hereby certified that error appears in the printed specification of the above numbered patent requiring correction and that the said Letters Patent should read as corrected below.

Column 1, line 27, beginning with "This application is generally", strike out the entire paragraph ending with "device together." in line 32, and insert instead:

This application is generally related to my copending applications Serial Nos. 297,098 and 334,147 and pending applications of John W. Anderson, Serial Nos. 404,279, 612,542, and 573,012, all of which disclose different forms of locking means or abutment means for detachably holding a wiper blade unit and a pressure unit together and/or whereby the components of the wiper unit are detachably connected.

column 3, line 62, for "flange" read -- finger --.

Signed and sealed this 25th day of June 1957.

(SEAL)
Attest:

KARL H. AXLINE                                                       ROBERT C. WATSON
Attesting Officer                                        Commissioner of Patents